(12) United States Patent
Kothnur et al.

(10) Patent No.: US 7,260,937 B2
(45) Date of Patent: Aug. 28, 2007

(54) METHOD AND APPARATUS FOR ACTUATING FUEL TRIM VALVES IN A GAS TURBINE

(75) Inventors: Vasanth Srinivasa Kothnur, Albany, NY (US); Mohamed Ahmed Ali, Clifton Park, NY (US); Daniel Doyle Vandale, Greer, SC (US); Matthew Eugene Roberts, Mauldin, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/670,542

(22) Filed: Feb. 2, 2007

(65) Prior Publication Data

US 2007/0125088 A1   Jun. 7, 2007

Related U.S. Application Data

(62) Division of application No. 10/704,302, filed on Nov. 10, 2003, now Pat. No. 7,188,465.

(51) Int. Cl.
 F02C 7/22 (2006.01)
 F02C 9/26 (2006.01)
(52) U.S. Cl. .......................... 60/773; 60/803
(58) Field of Classification Search .............. 60/39.281, 60/772, 773, 776, 803
 See application file for complete search history.

(56) References Cited

U.S. PATENT DOCUMENTS 2,629,225 A   2/1953   Ammann (Continued)

FOREIGN PATENT DOCUMENTS

EP   0677706   10/1995

(Continued)

OTHER PUBLICATIONS

PCT Search Report dated Jul. 5, 2005.

Primary Examiner—L. J. Casaregola
(74) Attorney, Agent, or Firm—Patrick K. Patnode; Curtis B. Brueske

(57) ABSTRACT

The gas turbines of the present invention have multiple combustion chambers, and within each chamber are multiple fuel nozzles. Each nozzle has its own fuel control valve to control the fuel flowing to the nozzles. To minimize the pressure drop through the fuel control valves, multiple manifolds are employed. Each manifold supplies at least one fuel nozzle in multiple combustion chambers with fuel. The fuel control valves are mounted on the manifolds such that the weight of the fuel control valves and nozzles are carried by the manifolds, not the multiple combustion chambers. A plurality of thermocouples for measuring exhaust gas from said multiple combustion chambers are employed to sense gas exhaust temperature. In carrying out the methods of the present invention for tuning a gas turbine, it is essential to note that the most efficient gas turbine is one which has the least nitrous oxides, the least amount of unburned hydrocarbons, and the least amount of carbon monoxide for a specified energy output. In order to tune the gas turbine to accomplish these objectives, it is desirable that each combustion chamber in the gas turbine be well balanced relative to the remaining combustion chambers. It is an aim of the present invention to tune each of the multiple combustion chambers such that no specific combustion chamber is rich or lean, and all are operating within about 1% of the remaining combustion chambers.

16 Claims, 3 Drawing Sheets

U.S. PATENT DOCUMENTS

| | | |
|---|---|---|
| 2,676,461 A | 4/1954 | Gove |
| 2,698,872 A | 1/1955 | Broffitt |
| 4,027,473 A | 6/1977 | Baker |
| 4,292,801 A | 10/1981 | Wilkes et al. |
| 5,024,055 A | 6/1991 | Sato et al. |
| 5,319,931 A | 6/1994 | Beebe et al. |
| 5,423,175 A | 6/1995 | Beebe et al. |
| 5,653,109 A | 8/1997 | Overton et al. |
| 6,003,296 A | 12/1999 | Citengo et al. |
| 6,460,346 B1 * | 10/2002 | Cleary ........................ 60/779 |
| 6,962,043 B2 * | 11/2005 | Venkateswaran et al. 60/39.091 |
| 2002/0150142 A1 | 10/2002 | Sanderson |
| 2002/0183916 A1 | 12/2002 | Cleary |
| 2003/0144787 A1 * | 7/2003 | Davis et al. ................. 701/100 |
| 2004/0025512 A1 * | 2/2004 | Davis et al. .................. 60/773 |

FOREIGN PATENT DOCUMENTS

| | | |
|---|---|---|
| EP | 1065346 | 1/2001 |
| EP | 131448 | 7/2003 |
| EP | 1445450 | 8/2004 |
| JP | 56-92326 | 7/1981 |
| JP | 07-317566 | 12/1995 |
| JP | 10-317991 | 12/1998 |
| JP | 2001355457 | 12/2001 |
| WO | WO02/061337 | 8/2002 |

* cited by examiner

METHOD AND APPARATUS FOR ACTUATING FUEL TRIM VALVES IN A GAS TURBINE

CROSS REFERENCE TO RELATED APPLICATIONS

This application is a Division of U.S. patent application Ser. No. 10/704,302 entitled "Method and Apparatus for Actuating Fuel Trim Valves in a Gas Turbine" filed Nov. 10, 2003, now U.S. Pat. No. 7,188,465 which is herein incorporated by reference.

FIELD OF THE INVENTION

This invention relates to methods and apparatuses for actuating fuel trim valves in a gas turbine to tune each combustion chamber. Additionally, this invention relates to a method of tuning each combustion chamber in a gas turbine such that combustor pressure oscillations, nitrous oxides, carbon monoxide, and unburned hydrocarbons are minimized.

BACKGROUND OF THE INVENTION

Fuel trim units are commonly used to control the fuel entering a combustion chamber in a multi-chamber combustor of an industrial turbine, for example a gas turbine. Generally, these units match the combustion airflow entering each combustion chamber such that the fuel-air mixture minimally produces, upon burning, nitrous oxides ($NO_x$), carbon monoxide (CO), and unburned hydrocarbons (UHC). In order to minimize CO and UHC, and achieve overall greater efficiency, it is desirable to increase the combustion temperature within the turbine. However, the oxidation of $NO_x$ in turbines increases dramatically with the increase in combustion temperatures.

One common method for reducing $NO_x$ is to lower the combustion temperature in a turbine system, or make the fuel-air ratio lean. However, if the fuel-air mixture is too lean, then 'lean-burn-out' occurs, and undesirable emissions increase dramatically. Therefore, a careful balance must be struck between (1) increasing the efficiency (minimizing UHC and CO) by increasing combustion temperature, and (2) decreasing the combustion temperature to minimize $NO_x$, or thinning the fuel-air ratio such that lean-burn-out occurs versus maximizing power output by increasing the fuel-air ratio.

It is extraordinarily difficult to achieve uniform temperature and pressure distribution in multiple combustion chambers of an industrial gas turbine. Variations in the airflow in each combustion chamber make it difficult to maintain constant fuel-air ratios in all combustion chambers.

These various teachings known to those skilled in the art are described in the following patents. U.S. Pat. No. 4,292,801 to Wilkes et al. discloses a 2-stage gas turbine capable of reduced emissions of nitrous oxides. U.S. Pat. No. 5,319,931 to Beebe et al. discloses a fuel trim system for a multi-chamber gas turbine engine. U.S. Pat. No. 5,423,175 to Beebe et al. discloses a fuel trim system for a multi-chamber gas turbine system in which sensor inputs with a fuel flow rate as well as the dynamic pressure in each combustion chamber and the turbine exhaust temperature are measured and accounted for in varying the fuel-air mixture.

Although these patents disclose fuel trim systems including multiple manifolds for supplying fuel nozzles with fuel in each combustion chamber of a multi-chamber gas turbine, none of these references teaches, suggests, or discloses to one skilled in the art a fuel trim valve for controlling each fuel nozzle in each combustion chamber. Furthermore, it is not obvious to provide each fuel nozzle in each combustion chamber with a fuel trim valve as this is extraordinarily difficult because: 1) there is limited piping room in a gas turbine engine to incorporate a fuel trim valve for each fuel nozzle; 2) in order to increase efficiency it is necessary to incorporate multiple fuel manifolds so that the pressure drop across each fuel trim valve is within a small uniform range; and 3) adjusting each of the fuel trim valves in each combustion chamber is a Herculean task.

Therefore, what are needed are systems and methods to control the fuel-air ratio of a multi-chamber gas turbine by employing a fuel trim valve with each fuel nozzle.

What are also needed are systems and methods to control the fuel-air mixture in each combustion chamber of a multi-chamber gas turbine such that the combustion chamber pressure oscillations, $NO_x$, UHC, and CO are minimized for a given energy output for the gas turbine.

What are further needed are simple systems and methods for adjusting each fuel valve in each combustion chamber, such that the fuel-air ratio in each combustion chamber can be optimized to minimize combustion chamber pressure oscillations, $NO_x$, UHC, and CO for the gas turbine.

SUMMARY OF THE INVENTION

Accordingly, the above-identified shortcomings of existing systems and methods for actuating fuel trim valves in gas turbines are overcome by embodiments of the present invention, which relates to systems and methods for tuning a gas turbine. The gas turbines of the present invention have multiple combustion chambers, and within each chamber are multiple fuel nozzles. Each nozzle has its own fuel control valve to control the fuel flowing to the nozzles. To minimize the pressure drop through the fuel control valves, multiple manifolds are employed. Each manifold supplies at least one fuel nozzle in multiple combustion chambers with fuel. The fuel control valves are mounted on the manifolds such that the weight of the fuel control valves and the nozzles are carried by the manifolds, not the multiple combustion chambers.

In one sense the present invention comprises a gas turbine having multiple combustion chambers, multiple fuel nozzles for each of the combustion chambers, multiple manifolds for supplying fuel to at least one fuel nozzle in multiple combustion chambers, each of said multiple manifolds having fuel control valves for each of said fuel nozzles said manifold supplies fuel to, wherein said fuel control valves are mounted on said multiple manifolds for controlling said fuel to said fuel nozzles in each of said combustion chambers.

In another sense, the present invention also comprises a gas turbine having multiple combustion chambers; multiple fuel nozzles for each of said combustion chambers; multiple manifolds for supplying fuel to at least one fuel nozzle in each of said combustion chambers; each of said multiple manifolds having fuel control valves for each of said fuel nozzles said manifold supplies fuel to; and a plurality of thermocouples for measuring exhaust gas from said multiple combustion chambers.

In carrying out the methods of the present invention for tuning a gas turbine, it is important to understand that the most efficient gas turbine is one which has the least nitrous oxides, the least amount of unburned hydrocarbons, and the least amount of carbon monoxide for a specified energy output. In order to tune the gas turbine to accomplish these objectives, it is desirable that each combustion chamber in the gas turbine be well balanced relative to the remaining combustion chambers.

Specifically, the present invention tunes each of the multiple combustion chambers such that no specific combustion chamber is rich or lean, and all are operating within about 1% of the remaining combustion chambers. In order to accomplish this, one skilled in the art must adjust those combustion chambers that are too rich, or too lean by tuning them more toward the average of all of the combustion chambers. To determine whether the combustion chambers are rich, lean, or average, one can make the calculation based on the amount of fuel delivered to each combustion chamber, or the fuel pressure delivered to each combustion chamber, or the temperature of the exhaust of each combustion chamber, compared to all the other combustion chambers. For example, if one of the combustion chambers is hotter than the remaining combustion chambers, the amount of fuel delivered to the nozzle per unit of time is higher than the remaining combustion chambers, and thus must be adjusted through the fuel control valve such that it is more average. Likewise, if one of the combustion chambers is running lean, the fuel control valve could be adjusted to increase the amount of fuel more toward the average of the remaining combustion chambers.

In the broadest sense, these methods of tuning gas turbines having multiple combustion chambers comprises constructing a swirl chart that relates the location of the exhaust from each combustion chamber to the location of exhaust from the entire gas turbine at a specified fuel load; identifying each of the combustion chambers as being rich, lean, or average; increasing said fuel load to each of said combustion chambers identified as lean and decreasing the fuel load to each of the combustion chambers identified as rich, and repeating the identifying and increasing/decreasing steps until all of said combustion chambers are within about say, 1% of average, thus minimizing the variation between each combustion chamber.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

For the purposes of promoting an understanding of the invention, reference will now be made to some exemplary embodiments of the present invention as illustrated in FIGS. 1-4 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted structures and methods, and such further applications of the principles of the invention as illustrated herein, as would normally occur to one skilled in the art, are considered to be within the spirit of this invention.

Figure 1:
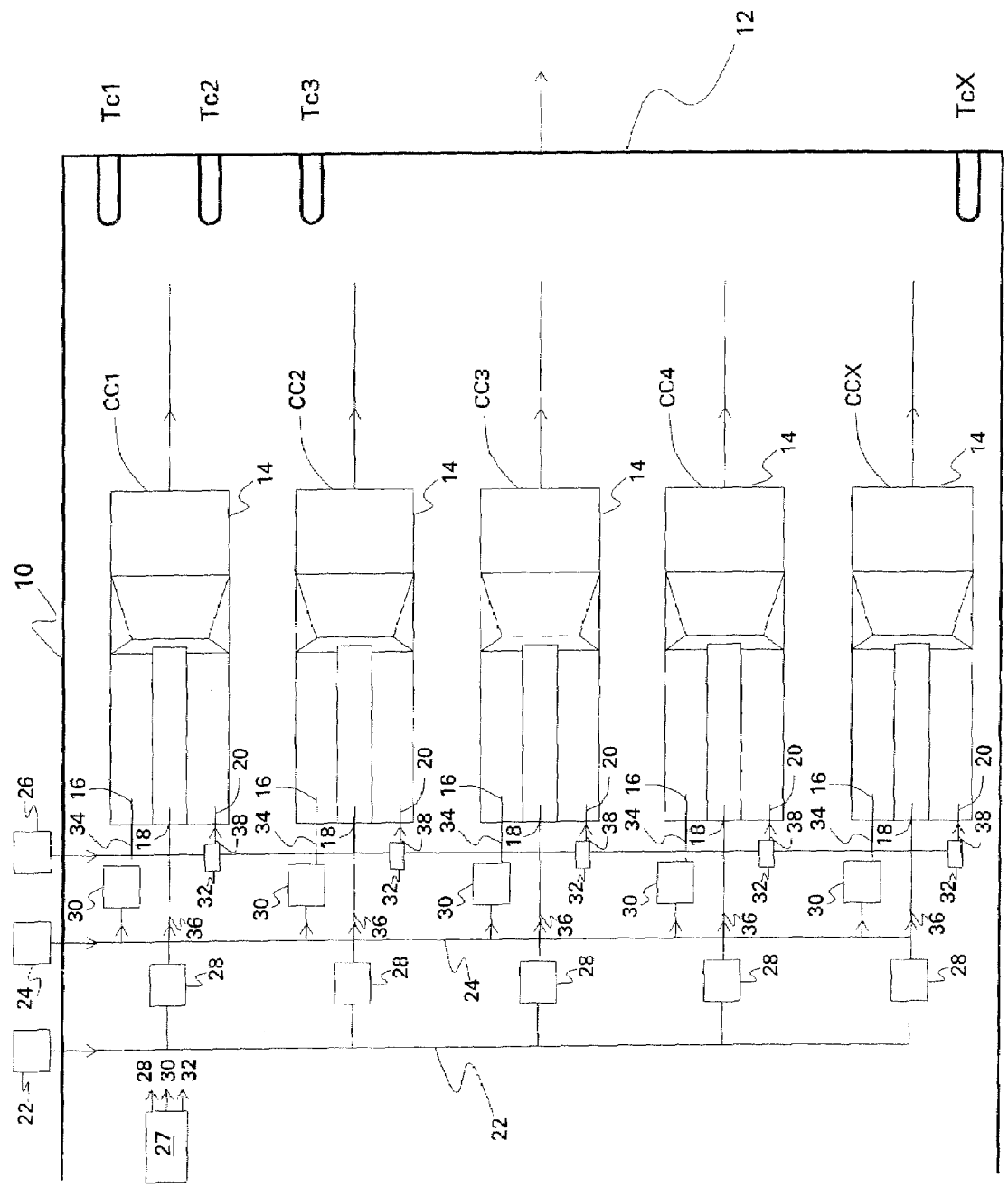
FIG. 1 is a schematic cross-sectional view of combustion chambers in a gas turbine showing multiple manifolds as well as exhaust thermocouples.

FIG. 1 shows a schematic partial cross-sectional view of a gas turbine 10. FIG. 1 does not show the air compressor or any details about the supply of combustion air to the gas turbine, as these details are known and conventional in the art. The exhaust outlet of the gas turbine is schematically indicated by reference numeral 12. Contained within the gas turbine 10 are multiple combustion chambers 14, which, for purposes of illustration, are shown as combustion chamber number 1 (CC1), combustion chamber number 2 (CC2), combustion chamber number 3 (CC3), combustion chamber number 4 (CC4), and combustion chamber number X. Depending on the energy output desired for the gas turbine 10, the number of combustion chambers 14 varies. A typical industrial gas turbine has fourteen combustion chambers. While the number of combustion chambers is a matter of design for the energy output desired, for purposes of the present invention, fourteen combustion chambers will be discussed and illustrated, in FIG. 3, for example. However, the present invention is not limited to fourteen combustion chambers.

Each combustion chamber 14 has multiple fuel nozzles for supplying fuel to the combustion chamber. In FIG. 1, these fuel nozzles are schematically illustrated by reference numeral 16, 18, and 20 in each of the combustion chambers 14. The number of fuel nozzles and their placement within each combustion chamber 14 is a matter of design. Generally, sufficient fuel nozzles are employed to obtain a uniform flow of fuel and air across each combustion chamber. Multiple manifolds 22, 24, and 26 supply each fuel nozzle 16, 18, and 20 with fuel, respectively. Multiple manifolds are employed to minimize the pressure drop from the manifold to the fuel nozzle. The number of manifolds employed is a matter of design.

Each manifold 22, 24, and 26 supports, and is fluidly connected with, fuel control valves 28, 30, and 32, respectively. Specifically, manifold 22 supports multiple fuel control valves 28, and each combustion chamber 14 is associated with at least one fuel control valve 28 that is coupled directly to manifold 22. As illustrated in FIG. 1, each fuel control valve 28 regulates the amount of fuel flowing from the manifold 22 to its associated fuel nozzle 18.

Likewise, fuel manifold 24 supports multiple fuel control valves 30, and each combustion chamber 14 is associated with at least one fuel control valve 30. Each fuel valve 30 regulates the amount of fuel flowing from the manifold 24 to its associated fuel nozzle(s) 16.

Further, manifold 26 has multiple fuel control valves 32, supported by the manifold and fluidly coupled with each combustion chamber 14. The fuel control valves 32 are directly coupled with the manifold 26, and with the associated fuel nozzles 20 in each combustion chamber 14, whereby the fuel valve 32 controls the amount of fuel flowing from the manifold 26 to the fuel nozzles 20. Each manifold may connect to each associated fuel control valve, or alternatively, each manifold may connect to less than all the associated fuel control valves. It is a design choice dependent on piping space in and around the gas turbine as well as the pressure drop through the fuel control valves.

Multiple supply lines 34 actually couple each fuel nozzle 16 to the fuel control valve 30. Likewise, each supply line 36 couples each fuel nozzle 18 with its corresponding and associated fuel control valve 28. Lastly, each supply line 38 couples each fuel nozzle 20 to the fuel control valve 32, which is fluidly connected with the manifold 26.

Although FIG. 1 illustrates three manifolds, any number of manifolds could be employed. As a practical engineering consideration, the cost of multiple manifolds must be balanced against an excessive pressure drop as the fuel flows from the manifold through the fuel control valve, through each supply line to each fuel nozzle in each combustion chamber 14. It can easily be determines when too many fuel control valves and associated fuel nozzles stem from a manifold such that the pressure drop across each fuel control valve is not consistent, and is deemed an excessive pressure drop.

Figure 3:
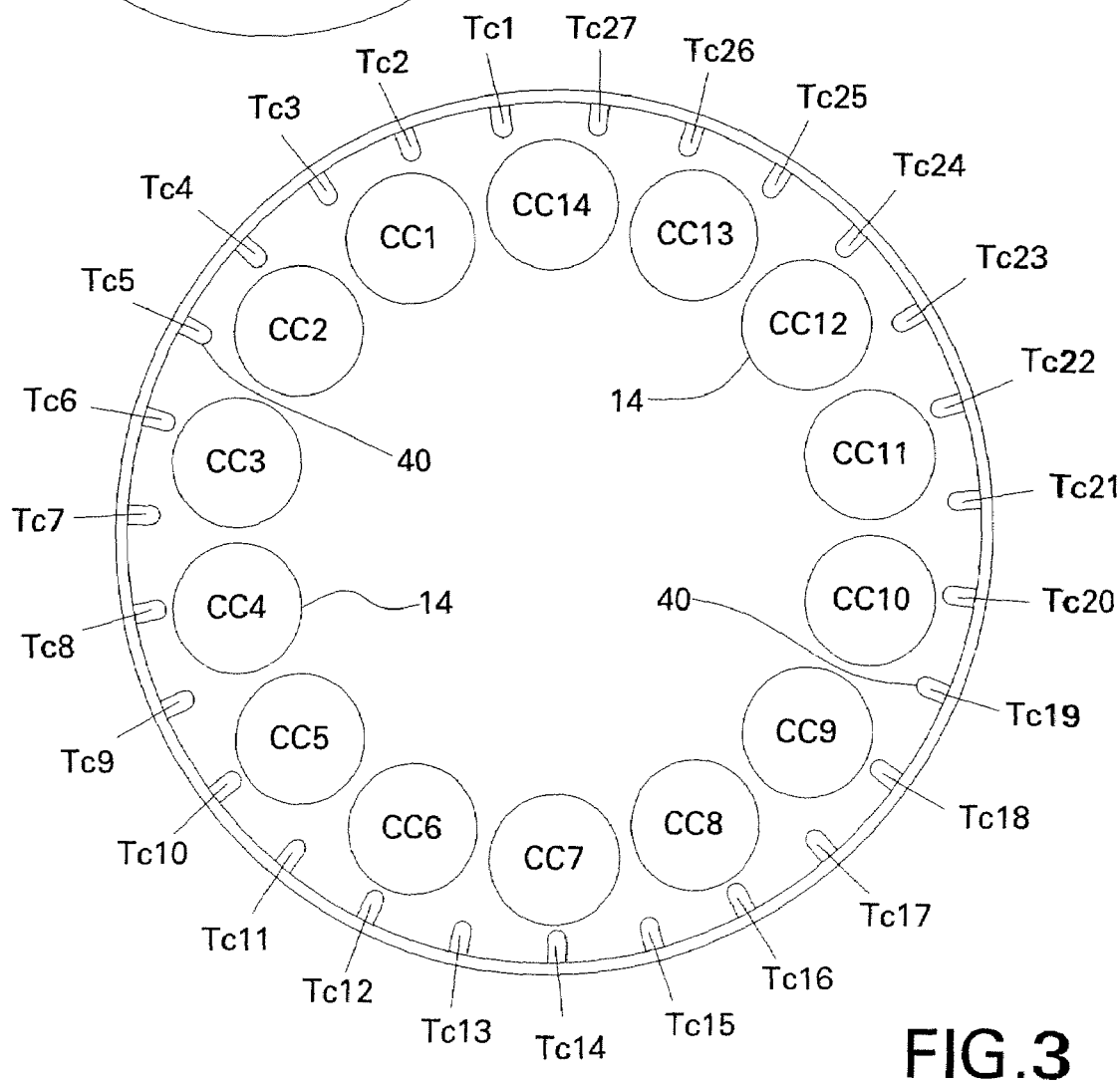
FIG. 3 is a schematic end view of the gas turbine illustrating fourteen combustion chambers with 27 thermocouples.

At the exhaust outlet 12 of the gas turbine 10 are multiple thermocouples 40 based about the periphery of the gas turbine 10, as illustrated in FIGS. 1 and 3. The number of thermocouples (TC1, TC2, TC3 . . . ) provided is a practical design choice. For an industrial gas turbine having fourteen combustion chambers, twenty-seven thermocouples are not unusual and are illustrated in FIG. 3. However, the number of combustions chambers, manifolds, nozzles, and thermocouples can vary depending on the desired energy output from the gas turbine.

Figure 2:
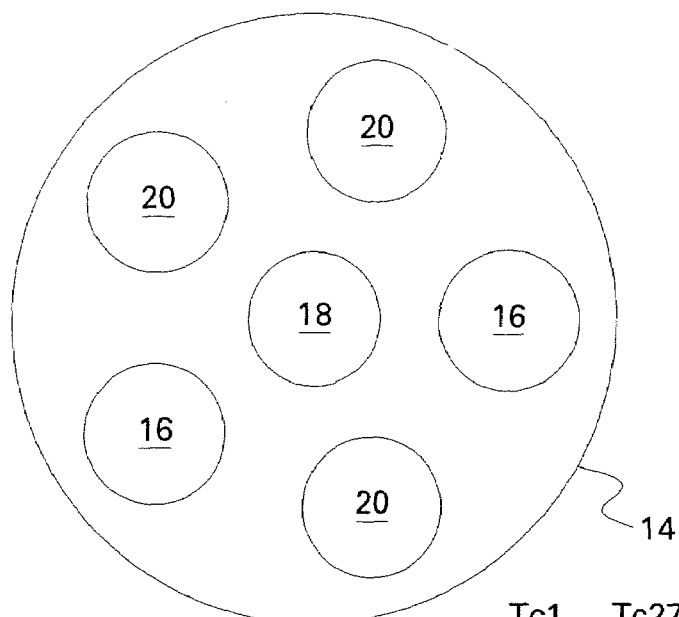
FIG. 2 is a schematic end view through a combustion chamber illustrating a potential arrangement of fuel nozzles.

FIG. 2 shows an exhaust end cross section of a combustion chamber 14 in which three fuel nozzles 20 are illustrated, along with two fuel nozzles 16 and one fuel nozzle 18. It is contemplated that each combustion chamber would have one central fuel nozzle 18 and any specified number of further fuel nozzles associated with one or more manifolds. Thus, the present invention is not limited to the arrangement in FIG. 2, which, relative to the number of fuel nozzles shown, is for illustrative and understanding purposes only. FIG. 2 also demonstrates that the manifolds 22, 24, and 26 are not necessarily the same size. If manifold 22, is supplying only fuel nozzle 18, it does not need to be as large as manifold 26, which supplies three fuel nozzles 20 in each combustion chamber 14. The size of the manifolds 22, 24, and 26, as well as the number of fuel nozzles 16, 18, and 20, all depend on the size of the combustion chambers 14, the number of combustion chambers, and the desired energy output from the gas turbine 10.

FIG. 3 schematically illustrates the exhaust outlet 12 of a gas turbine 10 illustrating 14 combustion chambers 14 (CC1, CC2, CC3 . . . CC14) and twenty-seven thermocouples 40 (TC1, TC2, TC3 . . . TC27).

Figure 4:
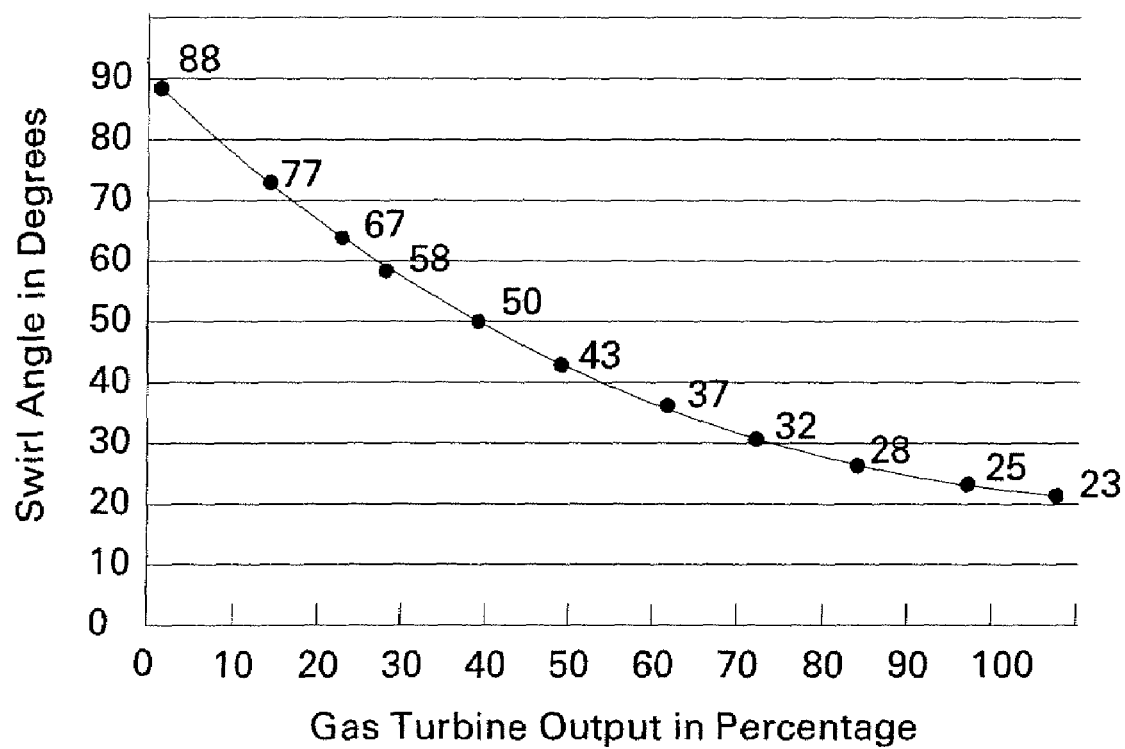
FIG. 4 is a swirl chart that relates the swirl angle in degrees to the percent of gas turbine output.

FIG. 4 is a typical swirl chart showing gas turbine output as a percent (0-100%) of capacity versus various swirl angles in degrees (1-90°). At low output, the swirl angle is larger. At high output, where the fuel-air volume is high, the angle is low (i.e., the fuel-air has a smaller residence time in the turbine, and it reaches the outlet 12 very quickly). At low output, the fuel-air residence time is one second, for example, while at high output the fuel-air residence time is perhaps 0.1 seconds. Therefore, the chart indicates the angle between any combustion chamber and the point where the exhaust from the combustion chamber crosses the outlet 12 of the gas turbine 10. In the arrangement described in FIG. 3, which shows fourteen combustion chambers, each combustion chamber occupies a segment equal to 360/14, or approximately 25.7 degrees. The swirl angle is measured with reference to the center of the segment that each combustion chamber occupies. The angle would increase as the load on the gas turbine 10 decreases. For example, if the load on the turbine is at 90% of the capacity, and the exhaust from combustion chamber #3 crosses thermocouple #8 as viewed in FIG. 3, (a clockwise rotation) then operating the gas turbine 10 at 50% of nameplate capacity may mean, for example, the exhaust exiting combustion chamber #3 now crosses thermocouple #10. Likewise, if the gas turbine 10 is reduced to 25% of nameplate capacity, for example, then the exhaust from combustion chamber #3 might cross thermocouple #12. Thus the swirl chart in FIG. 4 is merely a correlation between a specific combustion chamber and where its exhaust crosses the outlet 12 of the gas chamber 10 at specified loads. Thus, a swirl angle at 90% of nameplate capacity will be different than a swirl angle at 50% nameplate capacity. A swirl chart showing the rotation of the turbine flows at many different percentages of nameplate capacity, for example, would allow one skilled in the art to be able to tune the gas turbine 10 at any specified level (i.e., between 50% to 100% of nameplate capacity) and tune each and every combustion chamber so that the variation between each combustion chamber is now minimized. Once the swirl data is determined, a computer could then be employed to efficiently run the gas turbine at any level of nameplate capacity.

More specifically, the methods of the present invention of tuning the gas turbine would require construction of a swirl chart that relates the location of the exhaust from a specified combustion chamber to the location of the exhaust as it crosses the outlet of the gas turbine at specified fuel loads. In viewing FIG. 1, suppose that the specified fuel load is 80% of nameplate capacity. One skilled in the art would then move all the fuel trim valves mounted on manifolds 22, 24 and 26 to a mid-stroke position, thereby allowing one skilled in the art to either increase or decrease the flow into each fuel nozzle 16, 18 and 20 independently. One skilled in the art will then operate the gas turbine at 80% of nameplate capacity and increase the fuel in say, combustion chamber #3, thus creating a "hot spot" compared to the remaining combustion chambers. One skilled in the art notes what thermocouple(s) has/have the corresponding higher exhaust temperature. Thereafter, one skilled in the art will slowly decrease (and increase, if applicable) the nameplate capacity of the gas turbine 10 such that the "hot spot" can be monitored over the entire load range over which the gas turbine is to be tuned. The engineer can compare the experimental record of all thermocouples 40 (TC1, TC2 . . . TC27) with a similar record obtained when the fuel trim valves are all fully open. The artisan can then correlate the thermocouple that has shown the higher exhaust temperature (or the "hot spot") with the known location of the center of the combustion chamber that created the "hot spot" at every nameplate capacity. With this information on hand, one skilled in the art can construct a swirl chart like that shown in FIG. 4. The swirl chart can also be constructed by creating a "cold spot" in the gas turbine by decreasing flow to any combustion chamber using the fuel trim valve controlling flow to that chamber.

After determining the average exhaust temperature, taking into consideration all the thermocouples (in FIG. 3 all 27 thermocouples), one skilled in the art can then classify each combustion chamber as being rich, lean, or average. A rich combustion chamber creates a hot spot, while a lean combustion chamber would be indicated by a cooler temperature (i.e., a less than the average exhaust temperature). Due to the rotation of the combustor exhaust flows through the turbine and the minimal number of exhaust thermocouples at the turbine exit, it will be impossible to determine variations between combustion chambers by operating the unit at any one nameplate capacity. One skilled in the art will recognize that the process of classifying the combustion chambers 14 as rich or lean will be facilitated by monitoring the exhaust thermocouple record from the turbine exhaust 12 when the gas turbine 10 is slowly unloaded from 100% nameplate capacity to say, 50% nameplate capacity. Together with the swirl chart developed previously, the engineer can then correlate each combustion chamber with a specific thermocouple in the turbine exhaust outlet 12 and compare it with the average exhaust temperature at that nameplate capacity. With this analysis in hand, one skilled in the art could classify each combustion chamber as being rich (or lean) if the exhaust from said combustion chamber is always hotter (or cooler) than the average exhaust temperature across the range of nameplate capacity which the unit would be operated.

The engineer will then recognize that tuning any one combustion chamber would involve operating the unit at a nameplate capacity such that the exit from said combustion chamber can be directly monitored with an exhaust thermocouple at the exit of the gas turbine 10. All of the rich combustion chambers could be modulated by decreasing the fuel load, thereby dropping its exhaust temperature toward the average exhaust temperature calculated previously. While decreasing the fuel load to any rich combustion chamber, one skilled in the art will actuate all the fuel trim valves controlling fuel flow to the said combustion chamber simultaneously such that the relative flow to each fuel nozzle in said combustion chamber remains undisturbed; while the overall fuel flow to said combustion chamber is adjusted downwards. All of the lean combustion chambers are similarly tuned by increasing the fuel load, thus increasing the exhaust temperature toward the average calculated exhaust temperature. This tuning process will be carried out incrementally, with no need to decrease (or increase) the flow to a rich (or lean) combustion chamber to such a magnitude that it now becomes a lean (or rich) combustion chamber. The engineer will therefore, at all times, be cognizant of the exhaust temperature measurement from the thermocouple corresponding to the chamber being tuned and the average exhaust temperature from all combustion chambers at the nameplate capacity at which the gas turbine is being tuned.

Now, one skilled in the art can operate the gas turbine at any fuel load with these settings, knowing that the variation between the combustion chambers remains within the desired range at any fuel load, generally within 1%.

Once gas turbine 10 has been globally tuned, i.e. tuning each of the combustion chambers such that the variation between the overall fuel-air ratio between combustion chambers is within the specified or desired range, the last step remaining is to adjust the individual combustion chamber fuel splits between the multiple fuel nozzles in each combustion can. Once global tuning has been completed, an engineer can obtain a record of the combustor pressure oscillations in each combustion chamber and overall emissions from the gas turbine and determine if they are all within acceptable limits. Those skilled in the art will compare the relative magnitudes of the combustor pressure oscillations and determine if there is a significant variation between combustion chambers (say, the worst combustion chamber has a pressure oscillation of twice or thrice that of an average combustion chamber). Those skilled in the art will recognize that the combustor pressure oscillations are strongly dependent on the relative fuel flow between the multiple fuel nozzles mounted on each combustion chamber. If there is significant variation between combustion chambers, it is indicative that the fuel splits in some combustion chambers may be too "rich" or "lean" compared to the average combustion chamber. The objective of tuning the outlying combustion chambers (i.e., those that are significantly different when compared to an average combustion chamber) would be to increase or decrease the fuel split in order to balance the fuel splits amongst all combustion chambers. The engineer can now actuate the fuel trim valves mounted on each outlying combustion chamber so as to minimize the combustor pressure oscillation measured from said chamber. Those skilled in the art will recognize that this tuning process will be carried out incrementally, with no need to decrease (or increase) the fuel split to an outlying combustion chamber that is already lean (or rich); thereby increasing the combustor pressure oscillation instead of decreasing it.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method of tuning a gas turbine having multiple combustion chambers, comprising:
    i) constructing a swirl chart that relates location of exhaust from a combustion chamber to location of exhaust from the gas turbine at a specified fuel load;
    ii) using the swirl chart to identify each of said combustion chambers as being rich, lean, or average;
    iii) increasing said fuel load to each of said combustion chambers identified as lean, and decreasing said fuel load to each of said combustion chambers identified as rich; and
    iv) repeating said identifying and increasing/decreasing steps until all of said combustion chambers are within about 1% of the average, thus minimizing the variation between each combustion chamber.

2. The method of claim 1, wherein said step i) comprises employing multiple thermocouples and measuring the exhaust temperature about the entire periphery of the gas turbine exhaust using said thermocouples.

3. The method of claim 2, wherein said step i) includes spiking one of said combustion chambers with a higher fuel load and observing one or more thermocouples as measuring a higher exhaust temperature, thereby determining the swirl angle.

4. The method of claim 3, wherein said spiking step is repeated for a range of percentages of a maximum rated output of said turbine.

5. The method of claim 1, wherein said step ii) includes measuring the exhaust temperature of each combustion chamber, and comparing it with the remaining combustion chambers using the formula $Tv=(Teccx-Tgt)/Tgt$, where $Tv$ is the temperature variation, $Teccx$ is the temperature of the exhaust of a combustion can x, and Tgt is the average exhaust temperature of the gas turbine, and when Tv is positive, can x is rich, when Tv is negative, can x is lean; and when Tv is 0, can x is average.

6. The method of claim 1, wherein said step ii) includes measuring the fuel flow of each combustion chamber, and comparing it with the remaining combustion chambers using the formula $Fv=(Fccx-Fgt)/Fgt$, where Fv is the fuel flow variation, Fccx is the total fuel flow of a combustion can x, and Fgt is the average fuel flow of all the combustion chambers, and when Fv is positive, can x is rich, when Fv is negative, can x is lean; and when Fv is 0, can x is average.

7. The method of claim 1, wherein said step ii) includes measuring the fuel pressure of each combustion chamber, and comparing it with the remaining combustion chambers using the formula $Pv=(Pccx-Pgt)/Pgt$, where Pv is the fuel pressure variation, Pccx is the average fuel pressure of a combustion can x, and Pgt is the average fuel pressure of all the combustion chambers, and when Pv is positive, can x is rich, when Pv is negative, can x is lean; and when Pv is 0, can x is average.

8. The method of claim 4, wherein said spiked combustion chamber is reset to its position before it was spiked.

9. The method of claim 2, wherein said step i) includes spiking one of said combustion chambers with a lower fuel load and observing one or more thermocouples as measuring a lower exhaust temperature, thereby determining the swirl angle.

10. The method of claim 9, wherein said spiked combustion chamber is reset to its position before it was spiked.

11. The method of claim 9, wherein said step ii) includes measuring the exhaust temperature of each combustion chamber, and comparing it with the remaining combustion chambers using the formula $Tv=(Teccx-Tgt)/Tgt$, where Tv is the temperature variation, Teccx is the temperature of the exhaust of a combustion can x, and Tgt is the average exhaust temperature of the gas turbine, and when Tv is positive, can x is rich, when Tv is negative, can x is lean; and when Tv is 0, can x is average.

12. The method of claim 9, wherein said step ii) includes measuring the fuel flow and comparing it with the remaining combustion chambers using the formula $Fv=(Fccx-Fgt)/Fgt$, where Fv is the fuel flow variation, Fccx is the total fuel flow of a combustion can x, and Fgt is the average fuel flow of all the combustion chambers, and when Fv is positive, can x is rich, when Fv is negative, can x is lean; and when Fv is 0, can x is average.

13. The method of claim 9, wherein said step ii) includes measuring the fuel pressure and comparing it with the remaining combustion chambers using the formula $Pv=(Pccx-Pgt)/Pgt$, where Pv is the fuel pressure variation, Pccx is the average fuel pressure of a combustion can x, and Pgt is the average fuel pressure of all the combustion chambers, and when Pv is positive, can x is rich, when Pv is negative, can x is lean; and when Pv is 0, can x is average.

14. The method of claim 9, wherein said spiking step is repeated for a range of percentages of a maximum rated output of said turbine.

15. The method of claim 1, further including the step of providing each combustion chamber with multiple fuel nozzles and balancing the fuel flow through each of said fuel nozzles.

16. The method of claim 15, wherein said balancing step includes the step of setting the same nozzle pressure for each nozzle in each combustion chamber.

* * * * *